United States Patent [19]
Walker

[11] Patent Number: 4,746,147
[45] Date of Patent: May 24, 1988

[54] PIPE JOINT
[75] Inventor: Grant W. Walker, Sacramento, Calif.
[73] Assignee: ECW, Inc., Rio Linda, Calif.
[21] Appl. No.: 36,383
[22] Filed: Apr. 9, 1987
[51] Int. Cl.$^4$ .............................................. F16L 59/00
[52] U.S. Cl. ...................................... 285/53; 285/47; 285/374
[58] Field of Search ....................... 285/47, 48, 53, 54, 285/374, 294, 297, 337, 348

[56] References Cited
U.S. PATENT DOCUMENTS

| | | | |
|---|---|---|---|
| 2,024,602 | 12/1935 | Roberts | 285/53 |
| 2,894,538 | 7/1959 | Wilson | 285/53 |
| 3,711,124 | 1/1973 | Gerholt et al. | 285/47 |
| 3,712,648 | 1/1973 | Clifford | 285/374 |
| 3,731,710 | 5/1973 | Bauer et al. | 285/47 |
| 3,744,823 | 7/1973 | Muir et al. | 285/47 |
| 4,019,761 | 4/1977 | Heidemann | 285/47 |
| 4,084,842 | 4/1978 | Stonitsch et al. | 285/47 |
| 4,116,478 | 9/1978 | Yamaji et al. | 285/374 |
| 4,515,397 | 5/1985 | Nowobilski et al. | 285/47 |

FOREIGN PATENT DOCUMENTS

| | | | |
|---|---|---|---|
| 2137699 | 2/1973 | Fed. Rep. of Germany | 285/47 |
| 2445925 | 8/1980 | France | 285/47 |

Primary Examiner—Randolph A. Reese
Assistant Examiner—Anthony Knight
Attorney, Agent, or Firm—Lothrop & West

[57] ABSTRACT

Bell and spigot pipes are joined coaxially with a compressed gasket and are largely surrounded by a layer of insulation. A sleeve surrounds the joint so made and is sealed to the respective pipes and is filled with a foam insulator.

1 Claim, 1 Drawing Sheet

PIPE JOINT

CROSS-REFERENCES TO RELATED APPLICATIONS

This application is related to the contents of my co-pending ing application Ser. No. 06/837,906 filed Mar. 10, 1986 now U.S. Pat. No. 4,688,374 and entitled "Pipe Wrapping Machine".

BRIEF SUMMARY OF THE INVENTION

A first pipe with a bell and flange receives the spigot of a coaxial second pipe. A gasket between the bell and the spigot is deformed by a compressor ring. A layer of insulation around each pipe is sealed at the ends by silicone bodies each secured by a garter abutting the pipe and the insulation layer thereon. A sleeve extends coaxially around the insulation layers and the flange and the compression ring. Cuffs surround and are clamped on the ends of the sleeve and the adjacent one of the pipes. A body of foam is disposed within the sleeve and the cuffs and around the insulation layers and the pipes.

DETAILED DESCRIPTION

Figure 2:
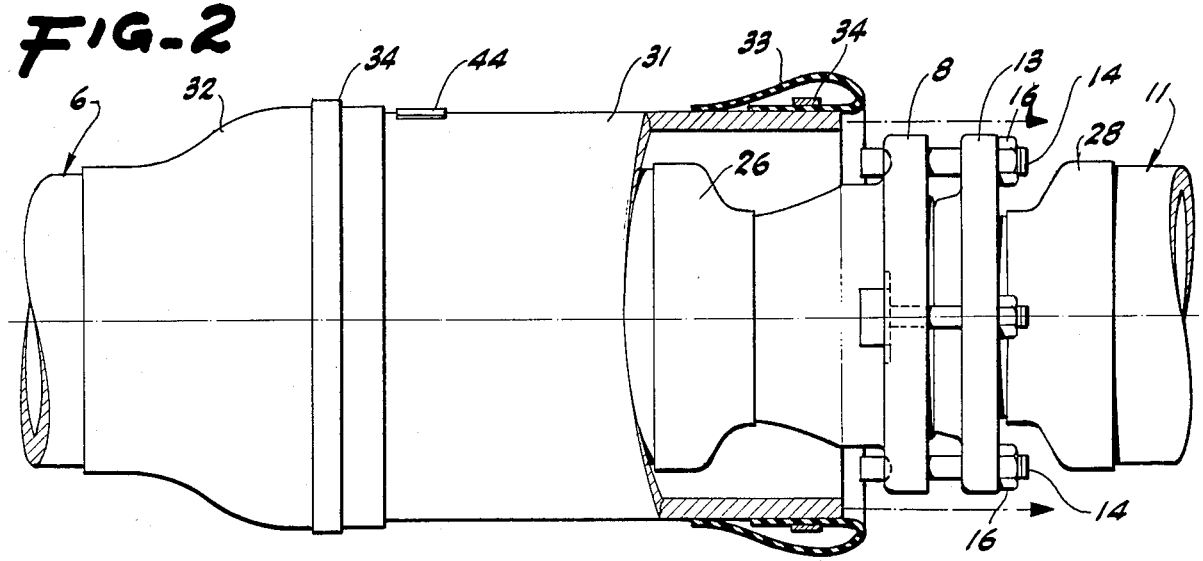
FIG. 2 is a side elevation of the structure of FIG. 1 during the course of assembly.
Figure 1:
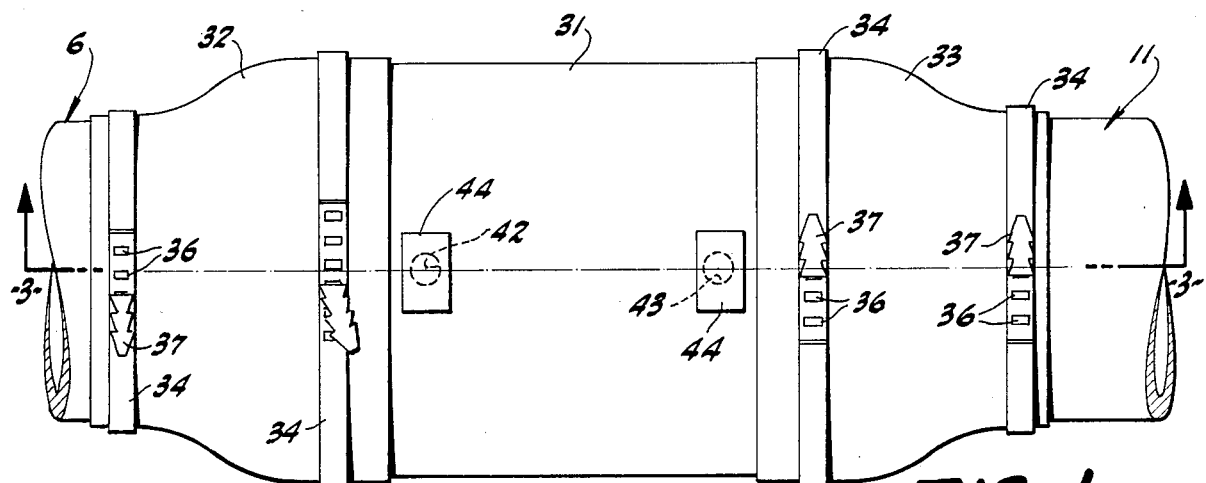
FIG. 1 is a plan view of the exterior of a finished pipe joint pursuant to the invention.

As disclosed in my copending application, circular-cylindrical pipe lengths of the bell and spigot type and surrounded by at least one layer of insulation need to be joined together in a coaxial fashion and in a way to preclude leakage and to insulate and protect the pipe and pipe joint.

A first pipe 6 is made, as shown in my copending application, either of a circular-cylindrical body of concrete or the like or plastic or metal and is generally symmetrical about a longitudinally extending axis 7, usually horizontal. The pipe 6 at one end has an enlargement or bell leading to an outstanding end flange 8. The bell is recessed to receive a deformable compression ring 9 usually of silicone rubber or the like. Continuing the first pipe 6 is a second pipe 11 of similar construction, usually, having a spigot end 12 receivable through the gasket and extending into the bell. The pipe 11 is usually aligned along the axis 7 as nearly as possible, so that the pipe 11 is surrounded by the gasket 9. A flanged compression ring 13 slides easily on the spigot and is brought to bear against and to deform the positioned gasket or ring 9 by a plurality of bolts 14. These pass through openings in the flange 8 and are variably tensioned by customary nuts 16 threaded thereon. This arrangement makes a continuous pipe connection with a tight joint so that the contents of the pipe cannot escape or, if the pressure gradient is reversed, so that extraneous material cannot leak into the evacuated pipe.

Figure 3:
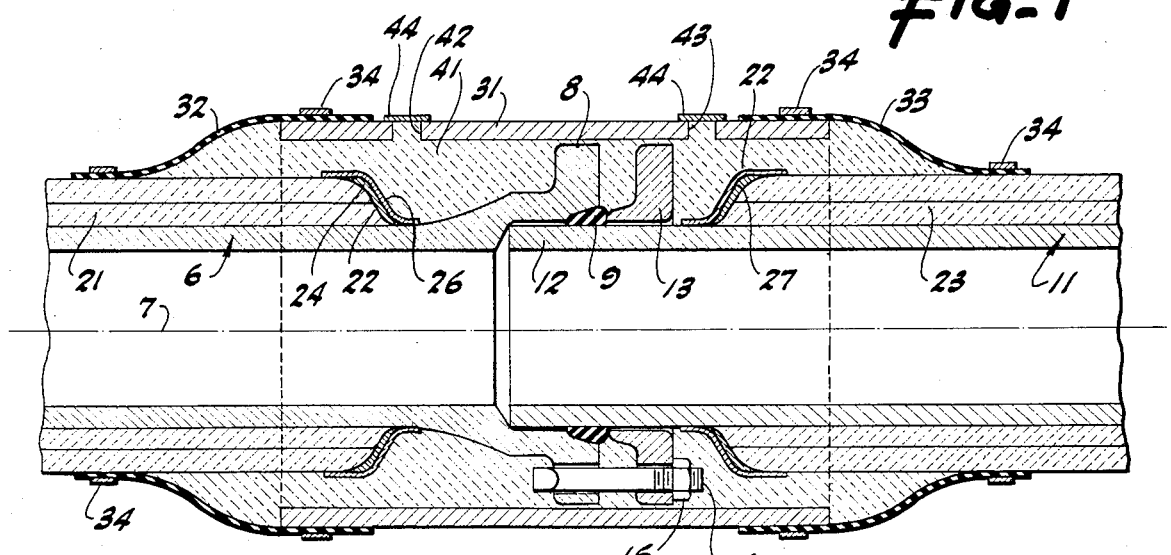
FIG. 3 is a cross-section on a vertical axial plane through the structure disclosed in FIG. 1 and as shown by the line 3—3 of FIG. 1.

In accordance with the invention and as disclosed in the identified application, the first pipe 6 is surrounded by at least one layer 21 of a suitable insulation, such as fiberglass or foamed polyurethane blanket. Preferably the insulation layer is wrapped around the pipe approximately twice so that, as shown in FIG. 3, there are, in effect, two layers 21. These layers have inclined ends 22 stopping somewhat short of or spaced from the flange 8 so that there is substantial intervening space.

Similarly, the second pipe 11 has a layer 23 of insulation which may be double, as shown in the drawing, and the ends of which are disposed at some distance from the end of the pipe spigot.

To make an appropriate joint in accordance with the invention, the end 22 of the insulation layer is preferably covered first with a coating or body 24 of silicone. Enclosing and protecting the otherwise exposed ends of the insulation is a garter or band 26 of material partly secured in place by an adhesive and particularly secured by heat-shrinking in place onto the insulation and the adjacent pipe. Similarly, a comparable garter or band 27 is disposed to cover the ends of the insulating layers on the pipe 11 and is covered by a band 28 heat-shrunk in place to afford a tight closure. This construction very well closes the ends of the insulating layer or layers and precludes flow into or away therefrom.

After these steps have been accomplished, the ends of the two pipes are encompassed in a surrounding relatively stiff sleeve 31 of sufficient axial extent to overlie the ends of the insulation layers and to overlie the flange 8 and the compression ring 13. There are small clearances between the flange and compression ring and the interior of the sleeve.

The sleeve 31 is moved axially into place at the joint and is held in position, preferably by butylene rubber cuffs 32 and 33 engaging the subjacent pipe insulation and also engaging the ends of the sleeve. The cuffs are held in position by surrounding bands 34 of a standard kind, usually of metal or plastic. Each band has a number of transverse openings 36 at one end through which flexible barbs 37 on the other end of the band can be introduced and slightly twisted to catch on and hold the band in a taut, secure position, thus holding the subjacent cuffs in place.

After this much assembly has been accomplished, the resulting interior voids are filled with a polyurethane foam mass 41 introduced through holes 42 and 43 in the sleeve at strategic locations. An appropriate gun is brought up to each of the holes 42 and discharges an insulating foam such as polyurethane foam into position so that the entire interior of the sleeve and the outside of both pipes and the flanges is filled and covered with polyurethane insulating foam. Finally, when the foam gun has been withdrawn, the holes 42 and 43 are closed by adhesive patches 44. These patches are of a flexible plastic material effective to separate the interior of the sleeve from the surrounding atmosphere.

Pursuant to the invention, there has not only been provided a way to hold together bell and spigot pipes along a common axis, but also to seal the insulation thereon from the surroundings and to encase and protect the insulation against any extraneous influences. The construction is such that there is considerable flexibility and some relative motion permitted between some of the parts since the pipes are not always exactly to size or shape and may not be precisely in line or concentric. When the interior spaces are finally filled with polyurethane foam and sealed, the pressures throughout the interior of the sleeve and of the foam mass are substantially uniform, and the desired density of insulation is provided.

I claim:

1. In a joint for two pipes both extending along an axis: a first pipe having a bell with a first radially outstanding flange; a second pipe having a spigot disposed in said bell; a deformable gasket surrounding said spigot and disposed in said bell; a compression ring disposed around said spigot and having a second radially outstanding flange; means including a bolt passing through said first radially outstanding flange and through said second radially outstanding flange for pressing said compression ring against said gasket; the combination of a first insulation layer having a first layer end, said first layer being disposed around and in contact with said first pipe in position to leave a first axial space between said first layer end and said first flange and to locate said first layer end radially inward of the periphery of said first radially outstanding flange; a second insulation layer having a second layer end, said second layer being disposed around and in contact with said second pipe in position to leave a second axial space between said second layer end and said second flange and to locate said second layer end radially inward of the periphery of said second outstanding flange; a first garter of heat-shrinkable material surrounding and in contact with said first pipe and overlying said first layer end; a second garter of heat-shrinkable material surrounding and in contact with said second pipe and overlying and in contact with said second layer end; a coaxial sleeve surrounding said first garter, said second garter, said first flange, said second flange and said compression ring; a first cuff surrounding one end of said sleeve and said first insulation layer; a second cuff surrounding the other end of said sleeve and said second insulation layer; means affording access to the interior of said sleeve and of said first cuff and of said second cuff; and a foam mass within said sleeve and said first cuff and said second cuff.

* * * * *